United States Patent [19]

Simmons

[11] 4,151,621
[45] May 1, 1979

[54] TOOLS FOR PUNCHING FASTENER HEADS

[75] Inventor: Frederick A. Simmons, Framingham, Mass.

[73] Assignee: Phillips Screw Company, Gloucester, Mass.

[21] Appl. No.: 846,986

[22] Filed: Oct. 31, 1977

Related U.S. Application Data

[62] Division of Ser. No. 505,324, Sep. 12, 1974, Pat. No. 4,084,478.

[51] Int. Cl.² ............... B23G 9/00; B21K 1/46
[52] U.S. Cl. ................................. 10/7; 10/26
[58] Field of Search ............ 10/3, 5, 7, 8, 19, 24, 10/26; 85/45; 145/50 A

[56] References Cited

U.S. PATENT DOCUMENTS

| 2,084,079 | 6/1937 | Clark | 85/45 |
| 2,676,510 | 4/1954 | Hodell | 85/45 |
| 3,108,623 | 10/1963 | Muenchinger | 10/7 X |
| 3,238,540 | 3/1966 | Muenchinger | 10/7 |
| 3,604,305 | 9/1971 | Dreger | 85/45 |

FOREIGN PATENT DOCUMENTS 5265 of 1881 United Kingdom ............ 85/45

Primary Examiner—E. M. Combs
Attorney, Agent, or Firm—Arthur Z. Bookstein

[57] ABSTRACT

A punch for forming a screw head is provided with grooves which will form projections on selected of the driver-engageable surfaces of the head. The projections are arranged to interlock with surfaces and edges of the driver to reduce the tendency for the driver to slip out of the recess during driving and also to provide a temporary stick-fit between the driver and the recess.

10 Claims, 66 Drawing Figures

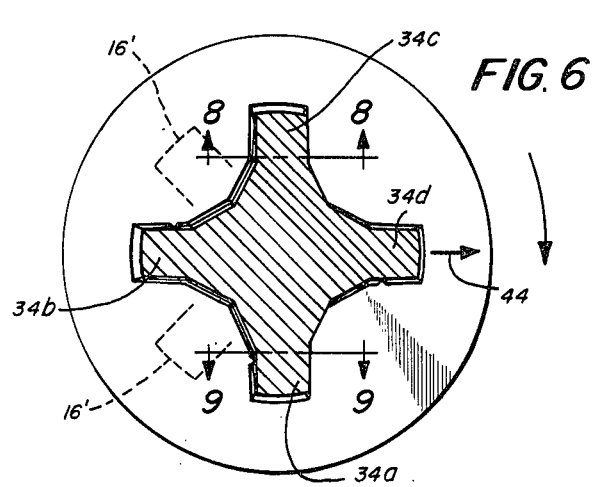
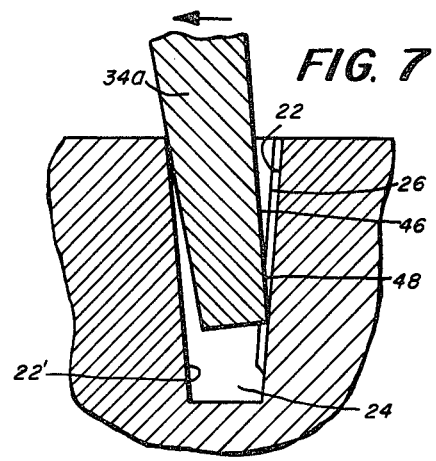
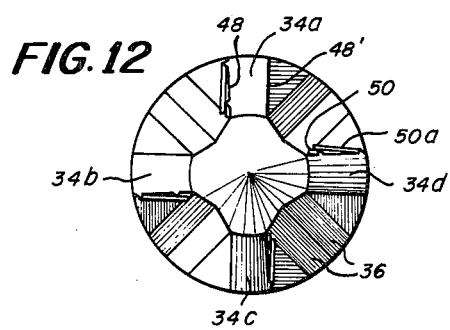
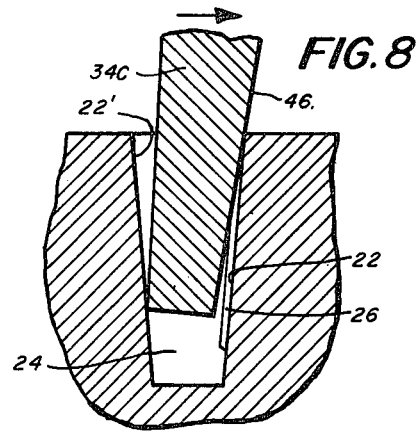
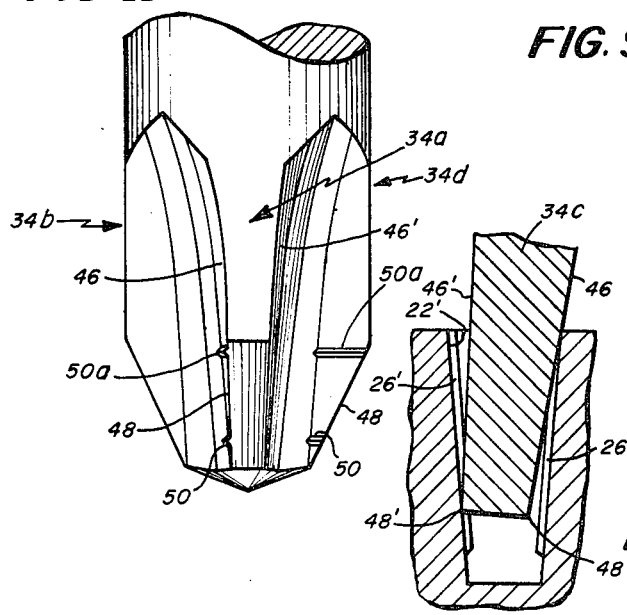
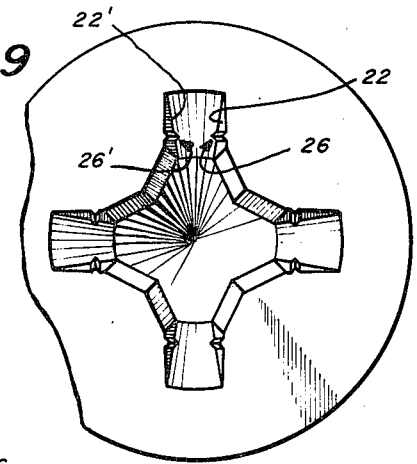

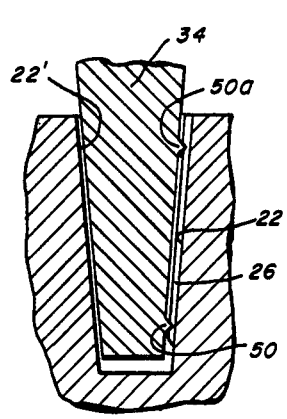
FIG. 13
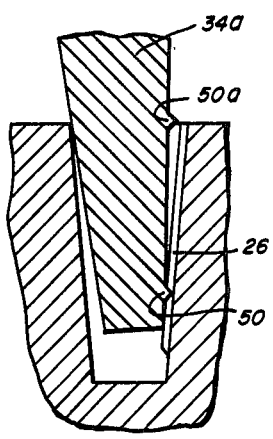
FIG. 14
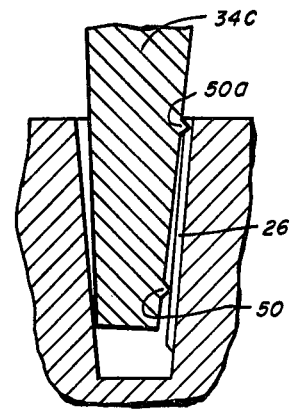
FIG. 15
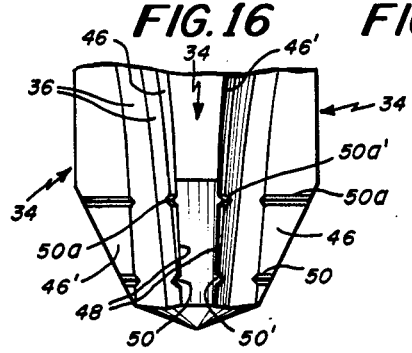
FIG. 16   FIG. 16A
FIG. 17
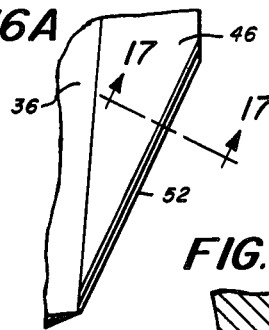
FIG. 17A   FIG. 18
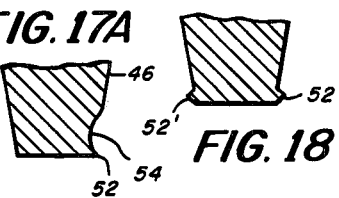
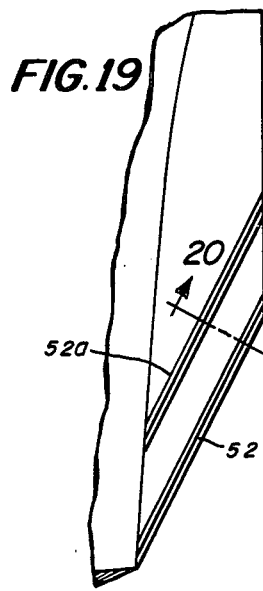
FIG. 19
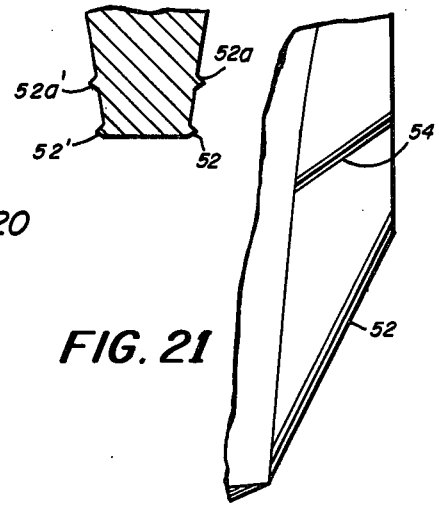
FIG. 20   FIG. 21
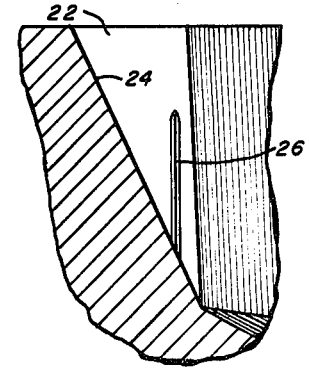
FIG. 22

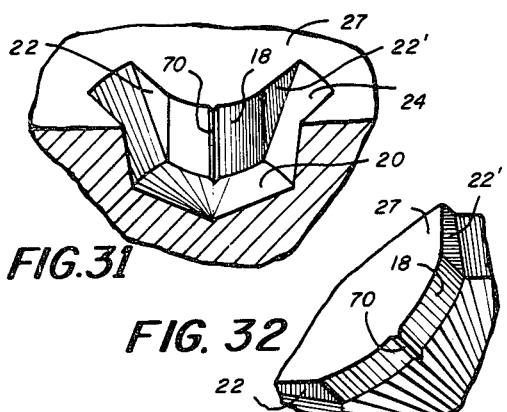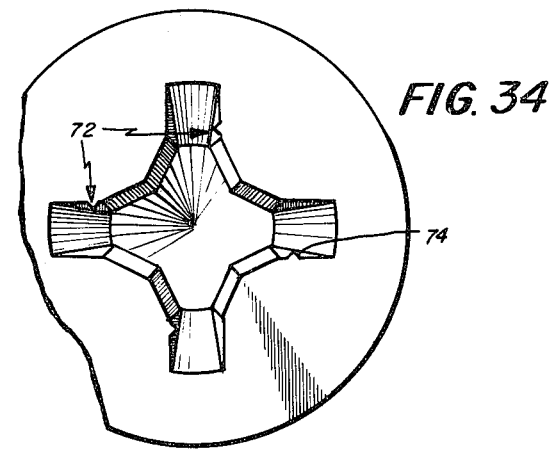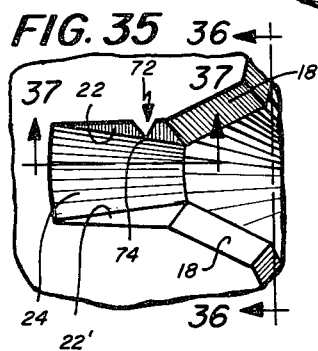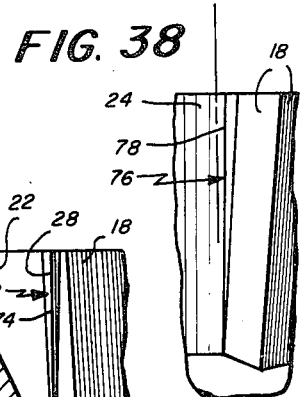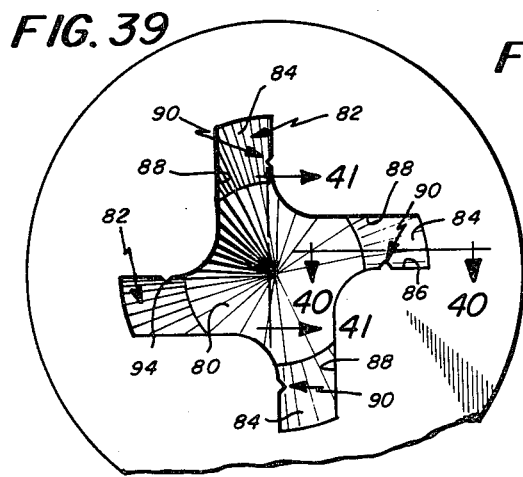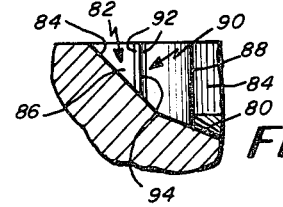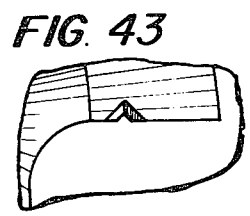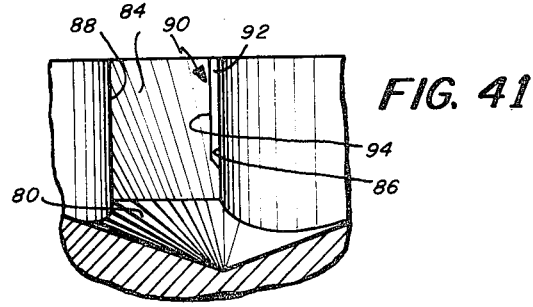

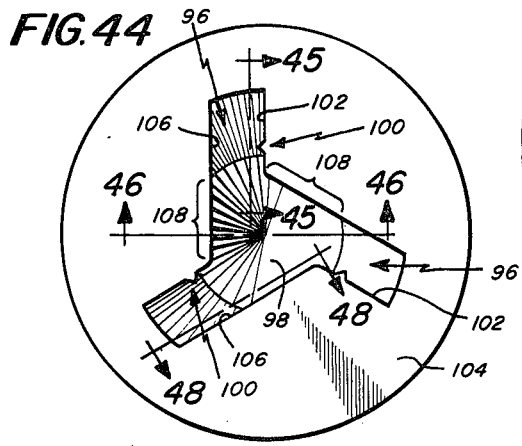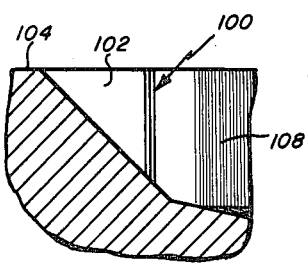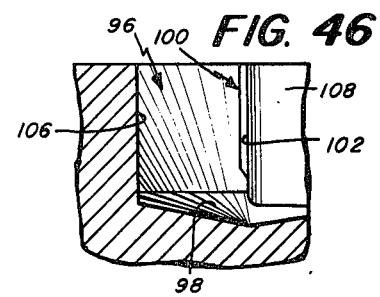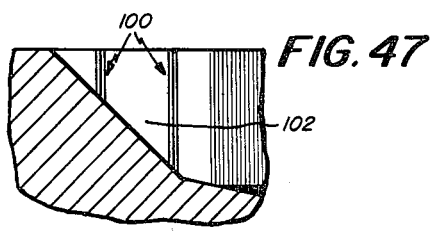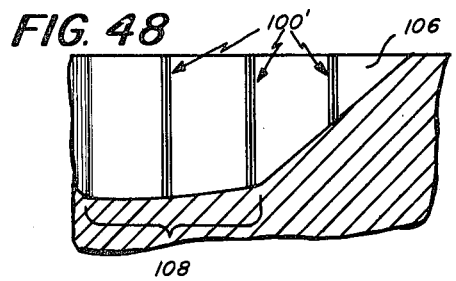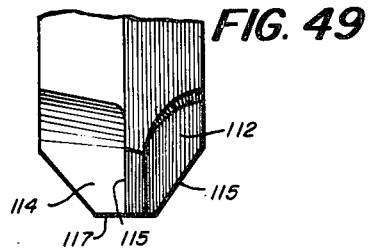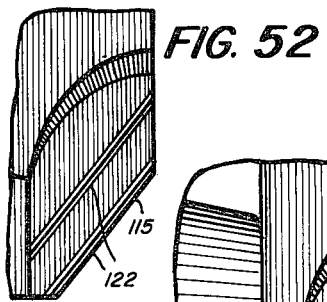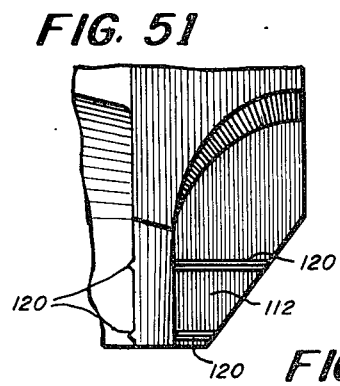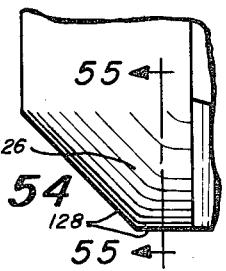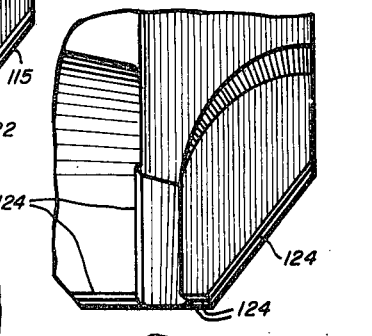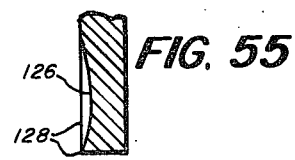

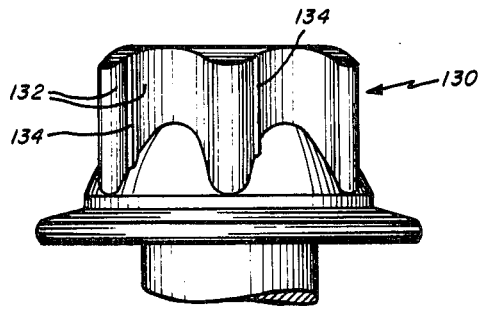
FIG. 56
FIG. 50
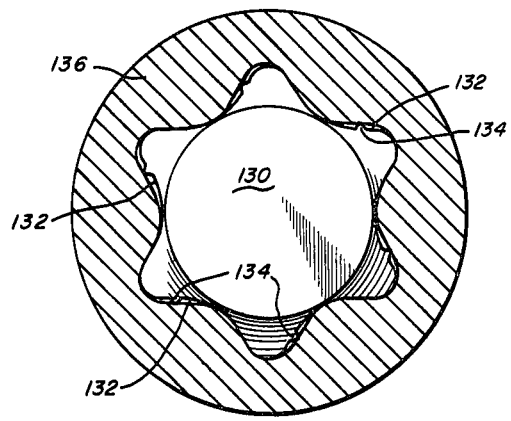
FIG. 57
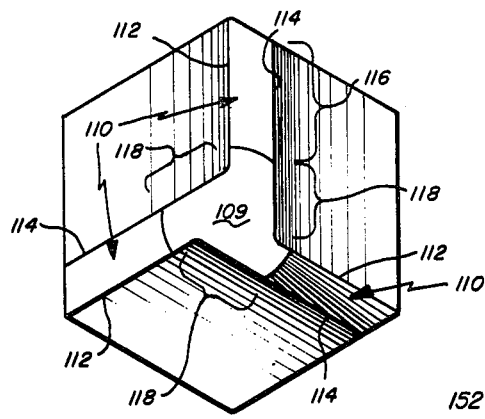
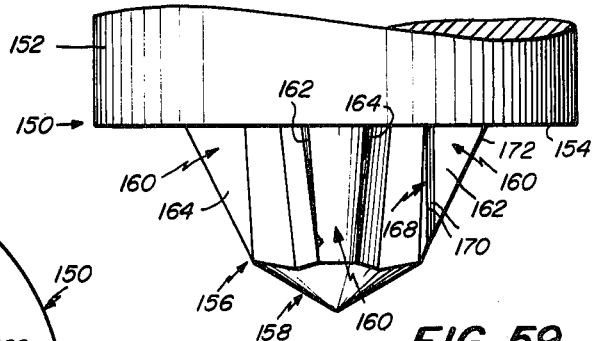
FIG. 59
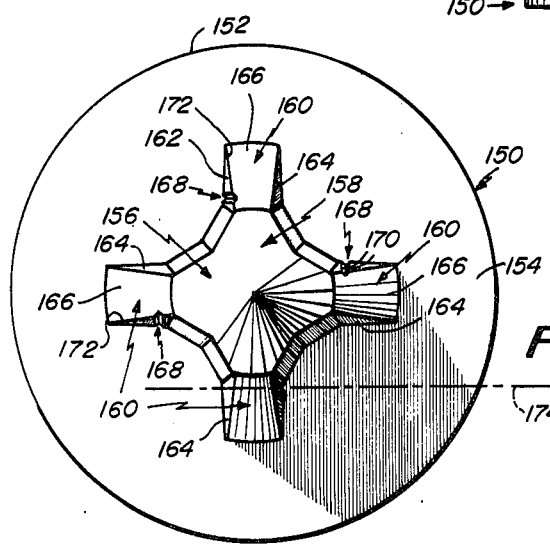
FIG. 58

FIG. 60
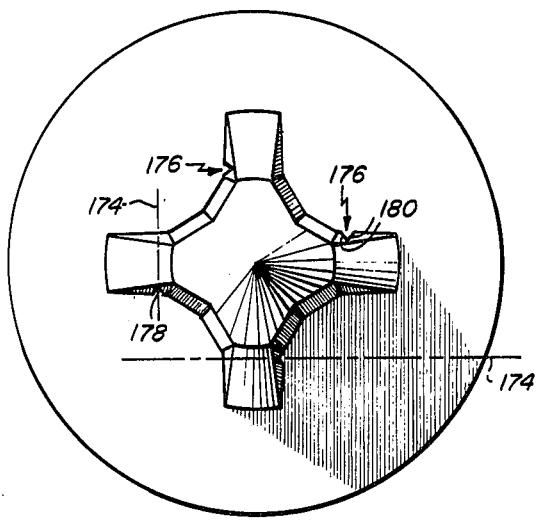
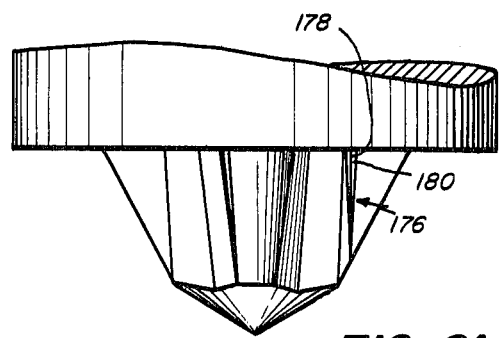
FIG. 61
FIG. 62
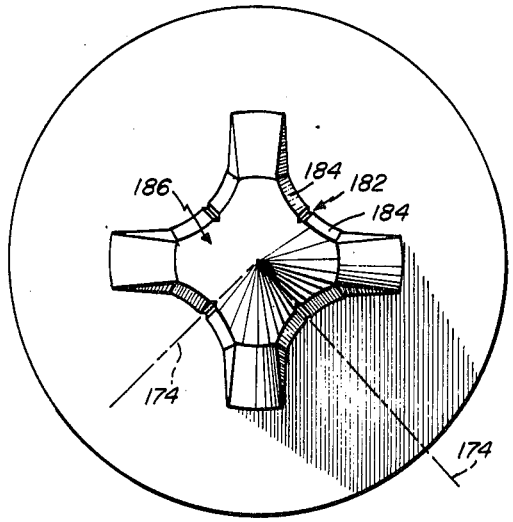
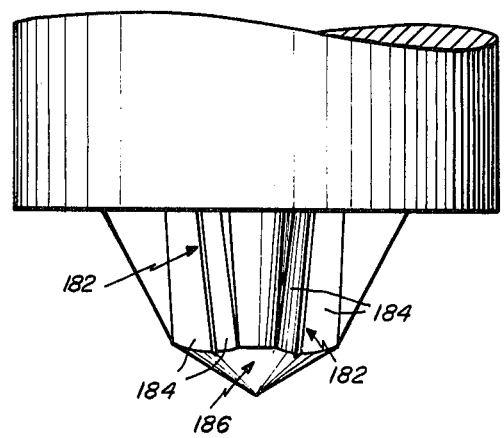
FIG. 63

TOOLS FOR PUNCHING FASTENER HEADS

This is a division of applicaton Ser. No. 505,324, filed Sept. 12, 1974, now U.S. Pat. No. 4,084,478.

BACKGROUND OF THE INVENTION

This invention relates to improvements in the manufacture of fasteners generally and in particular to manufacture of screws or the like having recesses which are suited to be driven with powered drivers. Among the primary difficulties which have been presented in connection with the driving of screws has been to control the torque to which such screws are tightened by the driver. The difficulties are amplified when power drivers are used. Prior to the development of power drivers with clutch devices, which may be preset to control the torque applied to the screw, the most widely used technique for contolling the torque was to design the shape of the driver-receptive recess and the driver so that they would disengage when a predetermined torque was reached. For example, U.S. Pat. No. 2,046,837 to Phillips shows such a recess in which the walls of the recess are inclined so as to impart an axial removal force to the driver as the applied torque increases, a characteristic referred to as "cam-out". While this was generally effective, it required some measure of skill by the operator in that in order for the driver to cam-out of the recess at the desired torque, the operator would have to control the amount of axial force of the driver and would also have to maintain the driving tool in substantially axial alignment with the screw. Because of the operator-controlled variables, it was not uncommon for power driven screws to be over-torqued or under-torqued. In addition, disengagement of the driver would cause the driver to slip out of the recess and sometimes mar the surface of the work.

With the development of improved clutches for power drivers to set and control the maximum applied torque, it became desirable to provide improved recesses which could be engaged by the driver more firmly to retard further the tendency to cam-out. To this end, efforts were made to design the driver-engaged driven surfaces of the recess so that they would be as vertical (parallel to the screw axis) as possible to avoid the camming effect of upwardly and outwardly inclined drive walls. For example, U.S. Pat. Nos. 3,237,506 and Re.24,878 illustrate recesses having substantially vertical drive walls.

While a recess having vertical drive walls is generally effective to retard cam-out along the axis of the screw when the driver is in axial alignment with the axis of the screw, there still is a tendency for the driver to slip out of engagement from the recess when the driver is out of axial alignment with the screw. The results from the fact that when the driver axis is out of alignment with the screw axis, the surfaces of the driver become inclined with respect to the recess surfaces which, when the screw is driven tends to urge the driver out of the recess. Thus, a certain degree of skill still is required even when using a power driver having a slip clutch in that the driver must be maintained in axial alignment with the screw in order to fully achieve the benefits of the vertical walled recess. However, even skilled operators, by reason of fatigue or for other reasons, sometimes may have difficulty in maintaining the driver and screw in axial alignment. It is among the objects of the invention to provide an improved recess configuration which retards the tendency of the driver to pop-out of or otherwise become disengaged from the screw recess even when there is some misalignment between the driver and the screw.

Also among the prior considerations relating to recessed screws is the characteristic which is commonly referred to as "stick-fit", a condition in which the recess and driver fit together so that the screw will cling to the driver when they are mated. This is desirable in those instances where it is an advantage to the operator to attach the screw to the driver so that he may then position the screw by the driver and then simply drive the screw into the workpiece. Such a stick-fit often is difficult to achieve with consistency because of variations in manufacturing tolerances. Also, drivers and recess-forming punches wear with use which may result in somewhat less than an ideal stick-fit between a particular screw and driver. Moreover, there are instances in which, while a stick-fit is an initially desirable characteristic, it may become undesirable if the fit is so tight that it tends to maintain the stick-fit after the screw has been driven. In this regard, many drivers hold the driver bit in a socket by a magnet which, if the stick fit is retained after the screw has been driven, results in the bit inconveniently remaining stuck to the screw after it has been driven as the magnets employed usually retain the bit only under a light force. It is among the objects of the invention to provide a screw recess having stick-fit characteristics and in which the force employed in driving the screw deforms those regions of the recess which provided the stick-fit, thus destroying the stick-fit and assuring easy removal of the drive bit.

SUMMARY OF THE INVENTION

In brief, the invention resides in the provision a punch having grooves which are constructed to form of one or more longitudinal ribs on the drive and/or back out walls of the screw recess. Each of the ribs extends along a direction which lies generally within a plane parallel the axis of the screw. Each rib projects slightly from the surface of the recess wall into the recess so that when the driver is inserted into the recess it will be engaged by the ribs under a light but sufficient force to enable the screw to cling to the driver. The ribs are dimensioned and located so that even when the driver is out of axial alignment with the screw (as is not infrequently the case) some of the edges of the blade or blades of the driver will dig into the ribs and interlock therewith to retard disengagement of the driver as long as the rotary driving force is applied. The ribs are integral with and are made from the same metal as the screw which typically is softer than that of the driver and will deform under the influence of the driving force. After the screw has been driven, and because the ribs have been deformed during the driving, the stick-fit is minimized or destroyed and the driver can be removed easily and without difficulty.

The driver may be of conventional construction to mate with the particular recess. In alternate embodiments of the invention, the driver may be modified to provide transversely extending ribs on selected regions thereof which will interlock with the ribs on the recess to enhance the grip therebetween.

It is among the objects of the invention to provide a punch for forming an improved screw recess which retards premature disengagement of the driver from the recess.

Another object of the invention is to provide a punch for forming an improved screw recess in which the driver engaging surfaces thereof are provided with one or more longitudinal ribs which extend outwardly of the recess surface.

Another object of the invention is to provide a punch for forming an improved recess of the type described in which the ribs are deformable and can interlock with selected regions of the driver.

A further object of the invention is to provide a punch for forming recess which will receive the driver in a stick-fit yet which will not tend to cling to the driver after the screw has been driven.

Another object of the invention is to provide a punch for forming screw having a recess in which precise conformity of the driver with the recess is not required for optimum performance.

DESCRIPTION OF THE DRAWINGS

The foregoing and other objects and advantages of the invention will be understood more fully from the following further description thereof, with reference to the accompanying drawings wherein:

FIG. 6 is a plan view of the recess and driver in the configuration of FIG. 5 with the driver being shown in section at the top surface of the screw as suggested by the line 6—6 in FIG. 5;

FIG. 7 is a somewhat diagrammatic illustration of the relationship between one of the driver blades and its recess groove as seen along the line 7—7 of FIG. 6;

FIG. 8 is an illustration of another of the driver blades similar to FIG. 7 and as seen along the line 8—8 of FIG. 6;

FIG. 9 is a plan view of the recess shown in FIG. 2 further modified to include the ribs, in enlarged exaggeration, of the invention on the drive walls and back out walls of the recess grooves.

FIG. 10 is an ilustration similar to FIG. 7 and illustrating the relationship between a misaligned driver blade and the recess groove configuration shown in FIG. 9;

FIG. 11 is a side elevation of a modified form of driver which may be employed in connection with the invention;

FIG. 12 is an end view of the driver of FIG. 11;

FIGS. 13-15 are somewhat diagrammatic illustrations taken in section through a combined recess groove and the blade of a driver shown in FIG. 11 and illustrating the cooperation between the recess groove and the modified driver blade;

FIG. 16 is a side elevation of a further modified driver;

FIG. 16A is an illustration of still another modified form of driver blade;

FIG. 17 is a sectional illustration of a driver blade as seen along the line 17—17 of FIG. 16A;

FIG. 17A is an ilustration similar to FIG. 17 and showing a variation of the configuration shown in FIG. 17;

FIG. 18 is an illustration similar to FIG. 17 showing a further variation thereof;

FIG. 19 is a side elevation of a driver blade embodying a further variant of the invention;

FIG. 20 is a sectional illustration of the variant of FIG. 19 as seen along the line 20—20 of FIG. 19;

FIG. 21 is a side elevation of still another modification of the invention;

FIGS. 22-24 are illustrations of further configurations for the drive and/or back out walls of the recess grooves;

FIG. 31 is an illustration of a recess having a rib included therein in accordance with a further aspect of the invention in which the rib is disposed at that portion which defines the central portion of the recess;

FIG. 32 is a plan view of the configuration shown in FIG. 31;

FIG. 34 is a plan view of a recess having inclined side walls and being provided with ribs in accordance with another aspect of the invention in which the ribs taper downwardly with respect to the groove walls from which they protrude, the ribs being shown in enlarged exaggeration;

FIG. 35 is an enlarged plan illustration of one of the recess grooves of FIG. 34;

FIG. 36 is an illustration of the recess shown in FIG. 35 as seen along the line 36—36 of FIG. 35;

FIG. 37 is an illustration of the recess groove shown in FIG. 35 as seen along the line 37—37 of FIG. 35;

FIG. 38 is an illustration similar to FIG. 36 and showing a further variation in the configuration of the rib;

FIG. 39 is a plan view of the invention as incorporated in another type of recess with the ribs shown in enlarged exaggeration;

FIG. 40 is a sectional elevation of the recess shown in FIG. 39 as seen along the line 40—40 of FIG. 39;

FIG. 41 is a sectional elevation of the recess of FIG. 39 as seen along the line 41-41 of FIG. 39;

FIG. 42 is an illustration similar to FIG. 41 showing a modified rib which is inclined downwardly and inwardly;

FIG. 43 is an illustration of the rib configuration of FIG. 42 as seen in plan;

FIG. 44 is an illustration of the invention as incorporated in still another type of recess;

FIG. 45 is an illustration of the recess shown in FIG. 44 as seen along the line 45—45 of FIG. 44;

FIG. 46 is an illustration of the recess shown in FIG. 44 as seen along the line 46—46 of FIG. 44;

FIG. 47 is an illustration similar to FIG. 45 showing a further variant of the rib configuration;

FIG. 48 is an elevation of a back out wall of the recess of FIG. 44 as seen along a direction suggested by the line 48—48 of FIG. 44 and modified to include ribs in accordance with the invention;

FIG. 49 is an elevation of a conventional driver used in connection with the recess shown in FIG. 44;

FIG. 50 is an end view of the driver of FIG. 49;

FIG. 51 is a side elevation of the driver of FIG. 49 modified to include a configuration of ribs in accordance with one aspect of the invention;

FIG. 52 is a side elevation of a portion of the driver of FIG. 49 showing a further variation in the rib configuration on a driver blade;

FIG. 53 is a side elevation of a further embodiment of the friber;

FIG. 54 is a side elevation of a portion of the driver showing the back out wall and the manner in which it may be hollowed out to engage the recess;

FIG. 55 is an illustration as seen along the line 55—55 of FIG. 54;

FIG. 56 is a side elevation of a protruding head for a screw fastener modified to include the invention; and FIG. 57 is a plan view of the fasteners shown in FIG. 56 and illustrating, in section, the manner in which the head is engaged by an appropriate driving tool.

FIG. 58 is an end view of a punch which may be employed to fabricate the recess shown in FIGS. 2 and 3;

FIG. 59 is a side elevation of the punch shown in FIG. 58;

FIG. 60 is an end view of a punch which may be employed to fabricate the recess shown in FIGS. 34–36;

FIG. 61 is a side elevation of the punch shown in FIG. 60;

FIG. 62 is an end view of a punch which may be employed to fabricate the recess shown in FIGS. 31 and 32; and FIG. 63 is a side elevation of the punch shown in FIG. 62.

DESCRIPTION OF THE PREFERRED EMBODIMENTS

Figure 1:
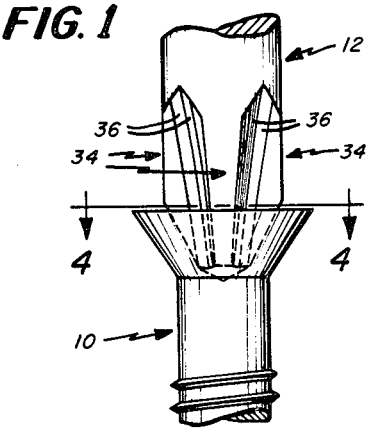
FIG. 1 is an elevation of a recessed head screw and driver in a mated configuration.
Figure 2:
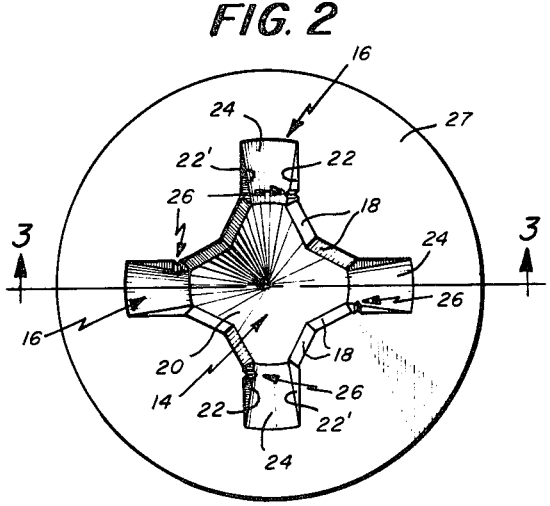
FIG. 2 is a plan illustration of a recessed head screw modified to include ribs pursuant to the invention with the ribs shown in enlarged exaggeration for clarity.
Figure 3:
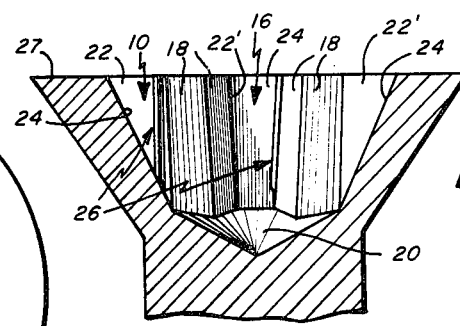
FIG. 3 is a sectional elevation of the recess as seen along the line 3—3 of FIG. 2.

FIG. 1 shows a combined recessed screw 10 and driver 12 with the driver seated ideally in the recess and in axial alignment with the screw. While the particular recess and driver shown is that described in U.S. Pat. No. 2,474,994 to Tomalis the principles of the invention may be employed with other types of recesses and screw head configurations, as will be apparent. FIGS. 2 and 3 illustrate the Tomalis recess modified to include one form of the present invention. The recess in this embodiment shown is of polygonal form and may be defined as generally cruciform in plan. The recess includes a central portion 14 and a plurality of grooves 16 radiating outwardly from the center portion 14. The grooves 16 are separated from each other by downwardly and inwardly inclined recess intermediate walls 18. The bottom regions of the grooves 16 and walls 18 merge into a generally concave recess bottom 20. Each of the grooves 16 is defined by a pair of triangular sidewalls 22, 22' and an end wall 24 which is inclined downwardly and inwardly. In the Tomalis screw illustrated, the groove sidewalls 22, 22' also are inclined but at a compound angle in which the planes of the sidewalls 22, 22' converge both in a downward and in an inward direction as defined more fully in the Tomalis patent. In the following description of the invention the screw and recess will be considered as right handed, in which sidewall 22 would be considered to be the driving wall when the screw is being fastened and in which the opposite sidewall 22' (the back out wall) will function as the driving wall when the screw is being removed.

Figure 2A:
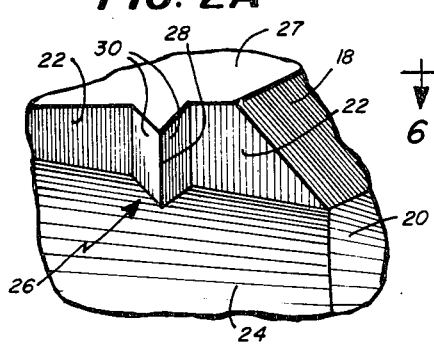
FIG. 2A is an enlarged plan illustration of a portion of the recess shown in FIG. 2 and illustrating, in enlarged exaggeration, the rib in accordance with the invention.

In accordance with the invention, the driving walls 22 of the recess grooves 16 are provided with longitudinal ribs 26. In the embodiment shown in FIGS. 2–7 the ribs 26 extend from the intersection of the drive wall 22 and end wall 24 of the grove upwardly toward the intersection of the top 27 of the screw head with the drive wall 22. The configuration and number of ribs 26 is subject to a number of variations, as will be described. In this configuration shown the rib 26 is of generally triangular cross-sectional shape having an apex or ridge 28 and sidewalls 30 which merge with the drive wall 22 (see enlarged FIG. 2a). The rib 26 extends the full height of the drive wall 22 and is located at the radially inward region of the drive wall 22, in proximity to the juncture of the drive wall 22 and the intermediate wall 18. The rib 26 protrudes from the drive wall 22 just slightly, for example, of the order of a few thousandths of an inch or less, depending on the size of the fastener, the illustration of the ribs herein being highly exaggerated for purposes of illustration. The apex 28 of the rib 26 faces inwardly toward the groove 16 and substantially parallels the plane of drive wall 22. The rib also extends along a direction which generally lies within a plane parallel the screw axis. In the embodiment shown in FIGS. 2 and 2A the sidewalls 30 lie generally in planes which do not parallel the screw axis and when viewed from the axis of the screw, as in FIGS. 2 and 2A, the surfaces of the rib sidewalls 30 will be exposed. As will be described with regard to other embodiments of the invention, the sidewalls of the rib 26 may be formed to lie in planes which do substantially parallel the axis of the screw, in which case the ridge 28 will also parallel the screw axis. In the embodiment shown in FIGS. 2 and 2A, however, where the sidewalls 30 are inclined as described, the ridge 28 will also be disposed generally askew to the longitudinal axis of the screw so that the rib 26 may receive the blade of the driver in a wedged fit.

Figure 4:
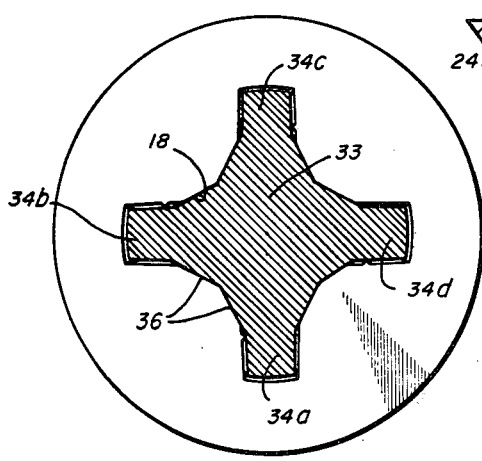
FIG. 4 is a plan view of the recess of FIG. 2 mated with a driver as suggested in FIG. 1 with the driver being shown in section at the top of the screw as suggested by line 4—4 in FIG. 1.

As shown in FIGS. 1, 4 and 6 the driver may be of conventional design having a shank 32 and a bit formed at the end of the shank, the bit being generally complementary to the recess. The bit is formed to define blades 34 which extend from a central core 33 and are equal in number and spacing to the grooves 16 in the screw recess. Between each pair of adjacent blades 34 the core 33 of the drive bit is defined by intermediate walls 36 generally complementary to the intermediate walls 18 of the recess. The bottom 38 of the driver may be formed with a generally conical tip similar in shape to the bottom 20 of the recess.

It may be noted that in the recess and driver described in the Tomalis patent a "stick-fit" characteristic is achieved by dimensioning the intermediate walls 36 of the driver and intermediate walls 18 of the recess so that when fully mated they engage in a close, wedging fit while the thickness of the driver blades 34 is slightly less than the width of the recess grooves. While under ideal manufacturing conditions the Tomalis recess and driver may be formed to achieve the desired wedging effect, the more usual manufacturing conditions often result in a recess-driver fit which is less than ideal. For example, as the punch employed in cold forming the recess wears from use, the resulting recess may not receive the driver in the intended manner and may not perform as intended. Also contributing to the difficulties encountered with the Tomalis recess is the phenomenon sometimes referred to as metal "fall-away" in which the upper regions of the groove sidewalls, as they approach the top surface of the screw head tend to curve outwardly and away from their intended location. This results in a progressively enlarged recess configuration near the upper portions of the recess which contributes to premature disengagement of the driver with the recess, particularly when the driver is slightly out of axial alignment with the screw.

By providing the recess with the ribs 26 in accordance with the invention, the above difficulties may be reduced materially. The ribs 26 are dimensioned to project into their respective grooves 16 so that they will present a slight interference with the blades 34 of the driver which are inserted into the recess grooves. Because the ribs 26 are of relatively small cross-sectional dimensions they enable the screw head to be manually applied onto the end of the driver in the desired stick-fit. The ribs 26 will perform their intended function even where a particular screw exhibits a substantial degree of metal fall-away. Such fall-away usually is confined to the upper portions of the screw recess. Where the ribs 26 exend downwardly to the bottom of the drive wall 22, at least the lower portions of the ribs 26 will be properly located to engage the driver blades 34 and cling to them. When the screw is driven, the force of the driver blades 34 against the slightly projecting ribs 26, particularly at the end of the driving procedure where the resistance to torque is substantially increased, deforms the ribs 26 which are quite small and deformable in relation to the strength of the driver. The ribs 26 deform to an extent sufficient to destroy the stick-fit characteristic thus enabling the driver to be withdrawn easily and without any tendency to remain stuck to the screw.

Figure 5:
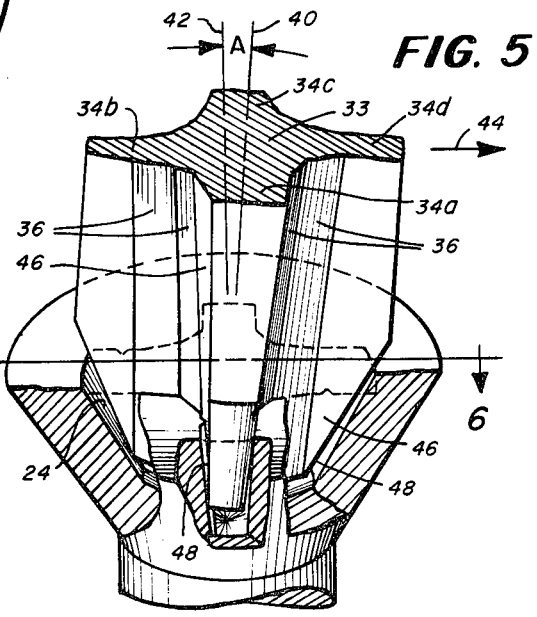
FIG. 5 is a fragmented illustration of the recess of FIG. 2 in engagement with a driver but with the driver axis being misaligned with respect to the screw axis.

The manner in which the ribs 26 retard the tendency for the driver to disengage from the recess during driving when the driver and screw are slightly misaligned may be seen from FIGS. 5-8. FIG. 5 is a fragmented illustration of a combined recess and driver in which the driver axis 40 is slightly misaligned from the screw axis 42 as suggested by the angle A. The driver also is slightly withdrawn from the recess as is typically the case when the driver and screw are misaligned. FIGS. 5 and 6 illustrate the relationship of the driver and recess when the misalignment is directly to the right of the recess axis as seen in those figures and as suggested by arrow 44 in FIGS. 5 and 6. When this condition occurs with the screw being driven in a clockwise direction, the primary contact between the driver and recess occurs between driver blades 34a and 34c with their respective grooves. Driver blades 34b and 34d, which lie generally along the direction of misalignment of the driver, effect little, if any, significant grip on any of the surfaces of their respective recesses. Thus, as shown in further exaggeration in FIGS. 7 and 8, the primary regions of contact between each of the driver blades 34a, 34c and their grooves will be at the region of engagement between the lower portion of one side of each of the driver blades 34a, 34c with one sidewall of the recess groove and the other region of contact will be between the upper portion of the opposite surfaces of the blades 34a, 34c with a more upwardly disposed portion of the opposite sidewall of their grooves. As seen in FIG. 7 the lower portion of the driving surface 46 of blade 34a will bear toward the driving wall 22 of its groove 16 which will cause the lower edge 48 of the blade 34a to dig into the rib 26 on the wall 22. This engagement of the driver blade with the rib results in an interlocking between the two which tends to retard further withdrawal of the driver from the recess.

As the rotation of the screw is continued but with the attitude of axial misalignment remaining the same it will be seen that as the blades 34 approach a further rotation of 90°, blade 34a will progressively decrease its engagement with its associated rib 26 while blade 34d progressively shifts to a more misaligned attitude in its respective groove, to the angle of misalignment A between the driver and screw. As blade 34d is progressively rotated to the misaligned attitude within its recess the lower edge 48 of blade 34d progressively digs into and interlocks with the rib 26 associated with that groove. Thus, as the screw is driven, the blades 34 successively dig into and release from the ribs 26 and in a manner which continually retards the tendency of the misaligned driver to be urged out of the recess. It also retards the tendency for the angle of misalignment to be increased.

With regard to the embodiment described thus far it may be noted that while blade 34c is canted within its recess groove (FIG. 8) its inclination with respect to the drive wall 22 is reversed from that of blade 34a, so that the driving surface 46 of blade 34c will engage the upper region of the rib 26 in that groove. While this may tend to flatten out the upper region of the rib it will not enable blade 34c to dig into the rib. In order to enhance the overall grip between the misaligned driver and the recess, it may be desirable to provide a rib 26' on the other, back out wall 22' of the groove 16 as shown in FIGS. 9 and 10. Thus, when a blade 34 is in the position of blade 34c, the lower edge portion 48' of the blade will engage the rib 26' on the back out wall 22'. Thus, the blades in the positions of blades 34a and 34c each will contribute to retarding of withdrawal of the misaligned driver from the recess when in the configuration shown in FIGS. 5 and 6.

The foregoing cooperation between the driver and recess may be enhanced further by providing a driver in which selected of the recess engaging surfaces of the blades are formed to increase the interlocking effect between the blades 34 and the ribs 26. FIGS. 11 and 12 show a modified driver in which the blades 34 include ribs 50 formed on the lower regions of their driving faces 46. The driver ribs 50 may extend generally transversely of the axis of the driver as shown and, in general, the driver ribs 50 should extend along a direction such that when the driver blades 34 are inserted into the recess grooves 16 the driver ribs 50 will cross and intersect with the ribs 26 on the recess drive walls 22. The driver and its ribs 50 which typically are made from a harder metal than that from which the screw and its ribs 26 are made will cause the driver ribs 50 to cross and dig into the recess ribs 26 under the influence of the applied torque as suggested somewhat diagrammatically in FIG. 13. If the driver and screw are axially misaligned, the driver ribs 50 may aid in digging into the recess ribs 26 as suggested in FIG. 14 which provides a somewhat better interlock between the blade and the rib 26 that that as suggested in FIG. 7. The driver may also include at least one additional driver rib 50a on the driving face 46 of the blade 34 so that in the event of a misaligned driver and screw, a blade in the position of blade 34c in FIG. 6 will be able to engage and dig into the upper region of the recess rib 26 as suggested in FIG. 15.

Where the recess groove is provided with ribs 26, 26' on each of the groove walls 22, 22', as suggested in FIGS. 9 and 10, the driver also may be provided with transverse blade ribs 50a, 50a' on both of its driving and backout surfaces as suggested in FIG. 16. In some instances it may be desirable to provide one or more additional ribs on the driver blades intermedite the ribs 50, 50a and 50', 50a'. It should be noted, however, that the number of ribs on each surface of the driver blades 34 preferably should not be too great in number or too closely spaced as this would tend to reduce the ability of the driver ribs 50 and/or 50a to deform and interlock with the recess ribs 26.

The principles described above with regard to the provision of ribs on the driver blades may be employed with other configurations. For example, as shown in FIGS. 16A and 17 a rib 52 may be provided along the lower edge of the blade 34. The rib 52 may be in the form of a projection as shown more clearly in FIG. 17 or may be formed effectively by hollowing the lower region of the face 46 of the driver blade as suggested at 54 in FIG. 17A to leave a relatively sharp rib 52 extending therefrom. FIG. 18 is an illustration similar to FIG. 17 but showing that ribs 52 and 52' may be formed on each lower edge 48 of each driver blade. Moreover, in some instances it may be desirable to provide further ribs in addition to the edge rib, as suggested in FIG. 19 in which a second rib 52a is formed parallel to the first edge rib 52. The ribs 52, 52a may be formed on each side of the blade as suggested at 52', 52a' in FIG. 20. FIG. 21 illustrates a further variation in which a plurality of driver ribs 52, 54 are provided on the face or faces of the blades and which they extend along different directions which neither parallel each other or the axis of the driver.

Figure 23:
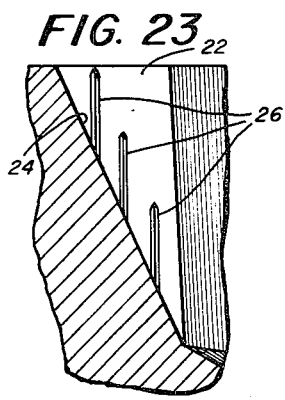
Figure 24:
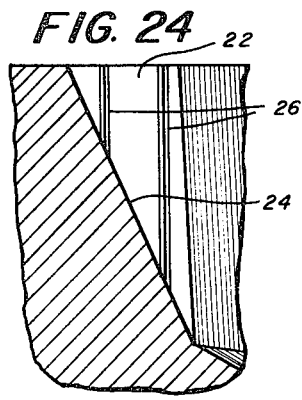

Still further modifications may be made with respect to the use of the ribs 26. For example, in some instances it may be found that satisfactory results are obtained when the rib does not extend fully to the top of the sidewall 22, or 22' of the groove but, instead, terminates before it reaches the upper end as suggested in FIG. 22. Additionally, there may be instances in which it is found to be desirable to employ a plurality of ribs 26 on either or both of the sidewalls 22, 22' of the recess grooves as suggested in FIG. 23 which shows a plurality of such ribs 26 in which the upper ends of the ribs lie generally along a line which parallels the end wall 24 of the particular recess groove 16. FIG. 24 shows a further variation in which the recess sidewall has a plurality of ribs 26 and in which each rib 26 extends fully from the bottom to the top of the sidewall.

Figure 27:
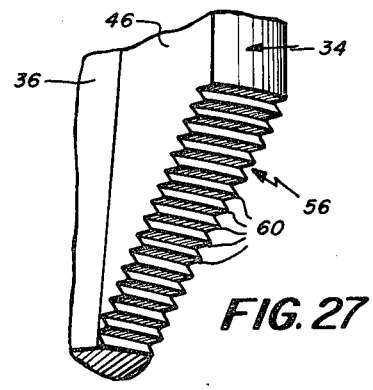
FIG. 27 is an illustration of one blade of a driver which may be employed advantageously with screws having significant amounts of fall away.
Figure 26:
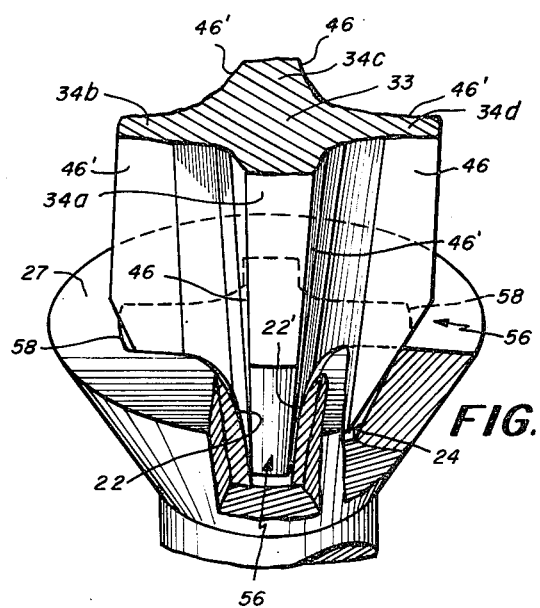
FIG. 26 is a fragmented illustration of a combined recess screw and driver in which the screw has a significant amount of fall away.
Figure 25:
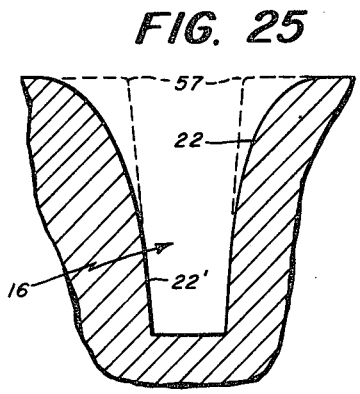
FIG. 25 is a somewhat diagrammatic sectional elevation, similar to that of FIGS. 7 or 8, illustrating the phenomenon of fall away in a cold formed recess groove.

The phenomenon of metal fall-away, referred to above, results in a screw having an imperfect recess, the degree of imperfection depending in part on the extent of metal fall-away. FIG. 25 is a sectional elevation of a recess groove as seen in a manner similar to FIGS. 7 or 8 but illustrating the effect of metal fall-away and the resulting groove configuration. As can be seen, the upper regions of the walls 22, 22' do not merge with the top surface of the screw in a well defined manner but instead, fall outwardly and away from their intended location (indicated in phantom at 57 in FIG. 25) with the result that a substantial portion of the upper regions of the walls flare upwardly and outwardly, in generally arcuate configuration. Recesses having a substantial amount of fall-away have an adverse effect on the functioning of the recess in that they provide a reduced driving wall area. In addition, because of the arcuate flared surface at the upper region of the recess wall, fall-away results in a more wobbly fit between the recess and the driver which, in turn, increase the tendency for the driver to become misaligned and cam-out or otherwise pop out of the recess. As may be seen from the fragmented illustration in FIG. 26 when the driver and screw are misaligned and with the driver partly withdrawn from the recess, the outer face 56 of the blades (here blade 34d) may bear against the outer top edge 58 of its associated recess groove. This results from the fact that the misalignment is not limited by engagement of the opposite drive and back out faces 46, 46' of the blades 34a, 34 c with their respective recesses as was shown in FIG. 5, because the upper regions of the sidewalls 22, 22' have fallen away and cannot engage the upper portions of faces 46, 46' of the driver blades. When this situation is presented, the primary contacting regions between the misaligned driver and recess will be at the lower region of the driving face 46 of blade 34a with drive wall 22 of its recess, the lower region of back out face 46' of blade 34c with the back out wall 22' of its associated recess and the end wall 56 of blade 34d with the upper region 58 of end wall 24 of its associated groove. In order to effect a more firm rip between the misaligned driver and screw, the end wall 56 of the driver blade may be formed to define serrations 60 (see FIG. 27) which can engage and effect somewhat of a grip on the upper portion 58 of the recess end wall 24.

Figures 29, 30:
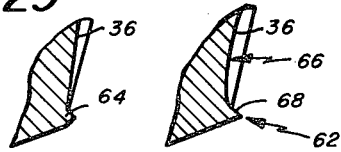
FIG. 29 is a fragmented sectional illustration of a portion of the driver of FIG. 28 as seen along the line 29—29 of FIG. 28.
FIG. 30 is an illustration similar to FIG. 29 showing an alternative to the structure shown in FIG. 29.
Figure 28:
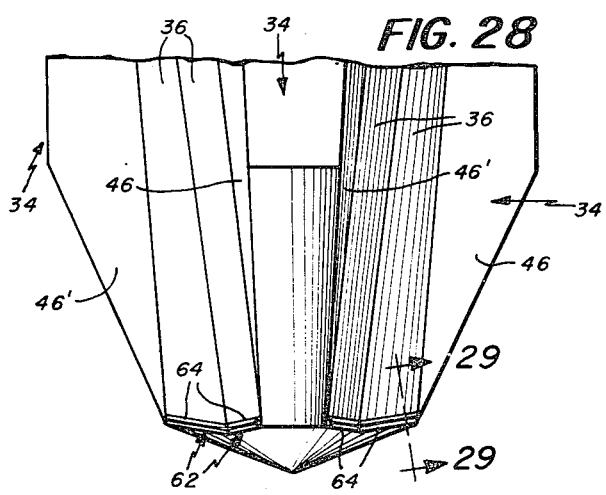
FIG. 28 is an illustration of a modified form of driver having recess-engaging ribs at locations between the driver blades.

It sometimes occurs that when the driver and screw are misaligned and with the driver slightly withdrawn from the recess, the primary points of contact between the driver and recess are not between the driver blades 34 and recess grooves 16 but are, instead, between the intermediate driver walls 36 and corresponding intermediate walls 16 on the screw. While this condition is more likely to occur when a particular screw has a significant amount of fall-away, it also may occur with a satisfactorily formed recess such as that shown in FIGS. 2 and 3 when the driver is misaligned and when the screw has been rotated approximately 45° from its orientation shown in FIG. 6 to the position suggested in phantom at 16' in FIG. 6 (i.e., the screw recess is in a position in which the direction 44 of misalignment generally bisects a pair of adjacent engaged driver blades and recess grooves). In order to resist further the tendency of the misaligned driver and recess to disengage when in this temporary attitude, the driver may be modified at the lower regions of its intermediate wall 36. The lower portion of the wall 36 is formed to define a rib 64 or protrusion which extends substantially fully along the length of its lower edge 62, from the lower end of the driver surface 46 of one of the blades 34 to the lower end of the back out surface 46' of the next adjacent blade 34. When the driver and screw are in the configuration described the rib 64 at the lower end of the driver wall 36 will be urged against the lower regions of the recess intermediate wall 36 and will tend to effect a grip therebetween, further retarding the tendency of the driver to disengage from the recess when in this configuration. The rib 64 may be formed in a variety of ways, including, for example, the hollowing out of the lower portion of the driver wall 36 as shown in FIG. 30. The hollowed out portion 66 may be made in a manner which will leave a relatively sharp edge 68 at the lower edge 62 of the driver wall 36 which will further tend to dig into the wall 18 of the recess. The recess itself may be modified as suggested in FIGS. 31 and 32 by forming it to include a rib 70 which is formed on its intermediate wall 18, the rib 70 extending from the bottom of the wall 18, where it meets the recess bottom 20, upwardly toward the top of the wall 18. The rib may extend fully to the top of the wall 18 as shown or may terminate below the top of the wall 18. The rib 70 should lie in a substantially vertical plane (one which parallels or coincides with the longitudinal axis of the screw).

Figure 33:
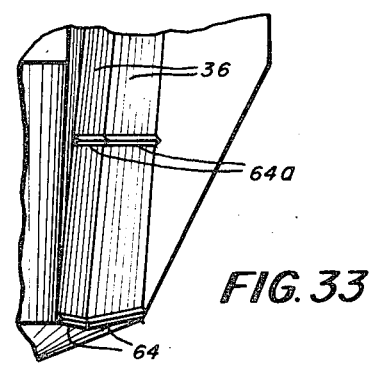
FIG. 33 is an illustration of a further variant of the driver shown in FIG. 28.

In addition to providing a rib 64 or sharp edge 68 at the lower edge 62 of the driver intermediate wall 36, the more upwardly disposed surfaces of driver wall 36 also may be provided with a rib 64a as suggested in FIG. 33. When the screw is in the 45° rotated position described above, it may thus engage the walls 18 on one side of the recess at their lower region and at the upper region of the walls 18 on the opposite side of the recess. Where ribs 64a are provided on the upper regions of the driver intermediate walls 36 it is preferred to employ recess wall ribs 70 which extend fully to the top of the recess so that the ribs 64a may engage the upper ends of the recess ribs 70. The driver ribs 64a should be located on the driver such that they will be below the top surface 27 of the screw even when slightly withdrawn from the recess.

Still further modifications may be made to the recess ribs 26 described above. For example, in the foregoing description the ribs 26 were shown as being of substantially uniform cross-sectional configuration and having a ridge 28 extending substantially parallel to the plane of the recess sidewall from which the ribs project. In some instances, however, it may be desirable to modify the configuration of the rib as shown in FIGS. 34-36 in which the rib 72 has an edge 74 which substantially parallels the axis of the screw. In this variation the generally triangular cross-sectional area of the rib increases in an upward direction when the groove sidewall from which the rib extends is inclined upwardly and outwardly. Alternatively, it may be desirable in some instances to employ a rib 76 of a configuration in which its ridge 78, as shown in FIG. 38 is neither parallel to the screw axis nor to the sidewall plane but still lies within a substantially vertical plane. In this embodiment, the height of the rib 76 as measured from the plane of its associated sidewall would be intermediate that of the rib configuration shown in FIGS. 34-36 and the rib configuration described with regard to the embodiment shown in FIGS. 2 and 3.

While the various aspects of the invention have been described thus far as being employed primarily in connection with a recess of the Tomalis type having inclined groove sidewalls, they may also be employed with other recesses. For example, FIG. 39 shows, in plan, a type of screw recess which is commercially available and which is described more fully in U.S. Pat. No. Re. 24,878 to Smith et al. In general, and as described in the Smith patent that recess includes a central portion 80 and a plurality of at least three angularly equidistant grooves 82 extending outwardly from the central portion 80 with each of the grooves being defined by a downwardly and inwardly inclined end wall 84 and a pair of substantially vertical walls such as the driving and back out walls 86, 88. This recess may be modified in accordance with the invention by forming it to also include vertical ribs 90 on either or both of one or more of the driving or back out walls 86, 88 as suggested in FIGS. 39-41. As shown the ribs 90 are of substantially uniform cross-section, generally triangular, having a pair of sidewalls 92 which meet at an apex 94. Each rib 90 extends along a direction which lies substantially along a generally vertical plane. The rib 90 extends from the bottom of the sidewall and may terminate at the upper edge of the sidewall or, if desired, somewhat below the upper edge of the sidewall. In addition, it may be found desirable in some instances to form the ribs 90 so that they taper upwardly as suggested in FIGS. 42 and 43 from which it may be seen that the cross-sectional area of the rib diminishes in an upward direction. The ribs 90 are effective to provide a stick-fit in cooperation with the driver as described above. It may be noted that here, as in the previously described embodiments, the relative dimensions of the rib, particularly the extent to which they protrude from their substantially vertical sidewall of the groove is exaggerated substantially in the drawings for clarity. It is intended that the ribs extend just very slightly from the sidewall with which they are associated, for example, of the order of a few thousandths of an inch, just enough to enable the ribs to cling to the engaged surfaces of the driver. The ribs are dimensioned so that they may be deformed under the increasing torque of the driver to destroy the stick-fit characteristic as described.

A commercially available variant of the recess described in U.S. Pat. No. Re. 24,878 is that shown in FIGS. 44-46 which has three grooves 96 extending outwardly from the central portion 98 of the recess. While the four-grooved recess shown in FIG. 39 displays relatively little tendency to disengage the driver, the three-grooved variant of the recess sometimes presents a tendency for the driver to rock out or spin out of the recess, particularly with smaller sized screws. This recess, too, may be modified to include the advantages of the invention by forming the recess to include a longitudinal rib 100 on at least one of the sidewalls as suggested in FIGS. 44-46 to provide the stick-fit characteristic which, while desirable with this recess, has not been readily achievable. Should it be desired to modify the three-grooved recess to retard the tendency of the driver to disengage from the recess, one or more such ribs 100 may be provided in association with at least one of the sidewalls of each of the grooves. Thus, as shown in FIGS. 44-46 the driving wall 102 of each of the grooves 96 may be provided with at least one rib 100 which is disposed preferably near the 100 extend regions of the driving wall 102. The ribs 100extend from the bottom of the sidewall 102 upwardly toward the intersection of the sidewall and the top surface 104 of the screw. If desired, the ribs 100 may terminate below the top surface 104 of the screw in the same manner described previously or may extend fully to the top surface 104 as shown. Further variations may be employed in the location and number of ribs such as suggested in FIG. 47 in which a plurality of spaced parallel ribs 100, are formed on the sidewall 102. Similarly, as shown in FIG. 48 the ribs 100' may be formed on the back out wall 106 if desired. In this regard it may be noted that in the three-grooved variant of this type of recess, the back out all 106 of each groove 96 is longer than the drive wall 102 of the groove in that the more inwardly disposed portions 108 of the back out wall also serves to define the central portion 98 of the recess, the innermost end 108 of the back out wall 106 merging with the drive wall 102 of the next adjacent groove. The ribs 100' may be provided on the inner portions, outer portions or both portions of the back out wall 106 as shown in FIG. 48.

The foregoing modifications to the three-grooved recess described may be employed in connection with a conventional substantially complementary three-blade driver shown in FIGS. 49 and 50. It may be desirable, however, to modify the driver to enhance further the grip between the driver and recess and FIGS. 51-55 illustrate various modifications of the conventional three-blade driver. As shown, the conventional three-blade driver configuration includes a central portion or core 109 from which three driving blades 110 extend, generally radially, each blade 110 having a driving surface 112 and a back out surface 114 which substantially parallel each other and lie along substantially vertical planes. Each of the blades 110 includes a lower edge 115 at its driving surface. The back out wall 114 associated with each blade may be considered as having an outer portion 116 which is received in the recess groove and an inner portion 118 which partly defines the core 109 of the driver and which fits within and against the inner portion 108 of the back out wall 106 of the recess. The lower edge 117 of the inner portion of the back out wall of the driver may be substantially horizontal. The driver may be modified in a manner similar to that described previously by providing one or more transverse ribs 120 on the driving face 112 of each blade to dig into and engage the ribs 100 on the corresponding surfaces of the recess. Alternatively, one or more ribs 122 may be formed on the driving surface 112 of the blade substantially parallel to the lower inclined edge 115 and one such rib 122 may be located at the lower inclined edge 115 (FIG. 52). A further variation is shown in FIG. 53 in which the rib 124 extends from the lower edge 115 of the drive surface substantially continuously along the lower edge 117 of the back out surface of the driver. In a further variation the back out wall may be somewhat hollowed out near its lower edge as suggested at 126 in FIGS. 54 and 55 to define a sharp edge 128 which may engage firmly the corresponding surface of the recess defining portion of the back out wall on the screw recess. Further variations may be employed, for example, in which the upper regions of each of the driving and back out surfaces of the driving blades are provided with substantially transversely extending ribs for engagement with the corresponding surfaces of the recess in a manner similar to that suggested in FIG. 16. While it is believed that these will be most effective in conjunction with a recess having upwardly extending ribs engageable with the transverse ribs on the driver, the modified driver is believed to increase the effectiveness in retarding the tendency to pop out even in the absence of ribs on the recess.

Certain aspects of the invention may be incorporated into other types of screw fasteners. For example, FIGS. 56 and 57 show a screw fastener having a protruding head described more fully in U.S. Pat. No. 3,584,667 to Reiland. The head includes an upwardly extending driven member 130 having generally serpentine peripheral surfaces which are arranged to define a series of drive walls 132. One or more of the driving wall surfaces 132 of the member may be provided with upwardly extending ribs 134 in substantially the same manner as described herein. The ribs 134 preferably are located at those regions of the driving surface where the driving tool 136 will exert maximum driving torque so that the ribs 134 may be deformed to destroy the stick-fit property as the screw is tightened.

It should be noted that the embodiments of the invention described with regard to recessed screw head configurations have been described in connection with the flat head screws. The various aspects of the invention may be employed with equal effectiveness with other screw head configurations including conventionally struck slotted heads. The various recess configurations may be formed by conventional cold heading machinery. The various recess rib and driver rib configurations may be employed independently of each other or in various combinations. The recesses may be employed with conventional drivers or modified drivers described herein, as desired.

The various recess configurations described above may be formed by conventional techniques in commercially employed heading machines. FIGS. 58 and 59 illustrate a punch of a configuration which is adapted to form the recess shown in FIGS. 2 and 3. The punch, indicated generally by the reference character 150, may be formed in accordance with conventional punch forming techniques but modified to include the present invention. The punch 150 includes a body portion 152 having a face 154 and an integral nib 156 which protrudes from the face 154. The nib 156 is the complement of the shape of the recess and the face 154 of the punch 150 is of complementary shape to that of the intended screw head, here described for purposes of illustration as a flat head. The nib 156 includes a central core 158 and a plurality of blades 160 which extend generally radially and outwardly from the core. Each of the blades 160 has a pair of side surfaces 162, 164 and an end surface 166 which is inclined upwardly and outwardly from the outer region of the core 158. The blades 160 at their upper ends, merge into the face 154 of the punch to define an integral structure. The surfaces 162 and/or 164 of the blades are provided with grooves 168 which are defined by groove sidewalls 170. The grooves define a cross-sectional area and configuration substantially identical to that of the rib 26 which is to be formed on the sidewall of the recess groove. Thus, the grooves 168 are of the order of a few thousandths of an inch in depth or less and their relative dimensions are exaggerated for clarity in the drawings. The grooves 168 may be formed on one or more of each of the surfaces 162 or, on both of the surfaces 162 and 164 as desired. In the illustrated punch the grooves 168 are formed on the surface 162 of each blade 160 which will define the drive wall 22. More than one such groove may be formed in order to form recesses having a plurality of ribs as described and as illustrated in FIGS. 47 and 48. The grooves 168 extend from the lower edge 172 of the respective blade sidewalls 160 and/or 162, where the sidewalls join the end surfaces 166, and extend upwardly to the extent desired. The grooves may extend fully to the top of the blades 160, where they meet the face 154 of the punch or, may terminate below the juncture of the blade 160 and face 154 depending on the rib configuration which is to be fabricated. Each of the grooves is formed so that it is symmetrically disposed about a substantially vertical plane (i.e., a plane which parallels the longitudinal axis of the punch, one such plane being shown at 174 in FIG. 58).

FIGS. 60 and 61 illustrate a punch which may be employed to cold form the recess of the type shown in FIGS. 34, 35 and 36. Here, the punch is provided with the same general arrangement as described above with regard to FIGS. 58 and 59. This punch, however, is illustrated to show the configuration of a modified form of groove 176 in which the rib intended to be formed has a ridge 74 (see FIG. 35) which does not parallel the recess sidewall from which it protrudes. Here, the bottom line 178 of the sidewalls 180 of the groove 176 does not extend parallel to the sidewall of the blade although each groove 176 is disposed symmetrically about a vertical plane 174. The sidewalls 180 may also be in vertical planes in this embodiment.

FIGS. 62 and 63 illustrate a punch for fabricating the recess shown in FIGS. 31 and 32. This punch is provided with a groove 182 extending along its intermediate wall 184 which defines in part the punch core 186 and which will form the intermediate walls 18 of the recess shown in FIGS. 31 and 32. These grooves 182, as the others defined above, also are symmetrically disposed along a substantially vertical plane 174.

In like manner punches may be fabricated to produce recesses of configurations like those shown in FIGS. 9, 23, 24, 39, 40–48 as well as external head configurations embodying the invention as suggested in FIGS. 56 and 57. The punch for forming one or more ribs on an externally wrenchable fastener would be defined by a socket corresponding to the shape of the head and provided with one or more grooves extending along the side surfaces of the socket. It is believed that the foregoing descriptions are sufficiently illustrative so that one of ordinary skill in the art may now incorporate the invention in various recesses including those illustrated as well as those which are not specifically shown as, for example, the recesses shown in U.S. Pat. No. 3,237,506.

It should be understood that the foregoing description of the invention is intended to be illustrative thereof and that other modifications and embodiments of the invention may be apparent to those skilled in the art without departing from its spirit.

Having thus described the invention what I desire to claim and secure by Letters Patent is:

I claim:

1. An impact tool for forming driver-engageable surfaces at an end of a rotatable fastener comprising:
   a body portion having an axis and having an end region lying along said axis, the end region having primary surfaces which define a primary geometrical shape substantially corresponding to that of the primary driver-engageable surfaces to be formed; and
   means forming at least one elongate groove of relatively small cross-sectional dimensions in at least one of said primary surfaces of said end region, said groove extending generally longitudinally of said axis, whereby when the end region of said tool is impacted into the material of the rotatable fastener, the primary surfaces of the end region will form said geometrically shaped primary driver-engageable surfaces and said elongate groove will form a projection of relatively small cross-sectional dimension extending from said at least one primary driver-engageable surface.

2. A tool as defined in claim 1 wherein said groove is substantially triangular in cross section.

3. A tool as defined in claim 1 wherein said elongate groove is of a cross section which is substantially symmetrical about a plane which extends parallel to the axis of the tool.

4. A tool as defined in claim 1 wherein the depth of said groove is of the order of a few thousandths of an inch.

5. A tool as defined in claim 1 wherein said elongate groove is sufficiently small so that it will form a projection of sufficiently small dimensions such that when the fastener is driven by a driving tool, said projection will be deformable in response to application of driving torque by the driving tool.

6. A tool as defined in claim 1 wherein the said driver engageable surfaces are recessed within said end of said fastener, said tool further comprising:
   said end region comprising a nib portion extending from said end of said body portion;
   said nib portion including at least one blade constructed and arranged to penetrate a work blank to form a driver-receptive recess; and
   said groove being formed on a surface of said blade.

7. A tool as defined in claim 6 further comprising:
   said nib including a central core and a plurality of said blades radiating generally outwardly from said core, each of said blades being constructed and arranged to form a recess having a plurality of generally outwardly radiating wings which define said recessed driver-engageable surfaces, each of said blades having opposite sidewalls adapted to form a drive wall and a removal wall for each of said recess wings;
   said groove being formed along at least one of the sidewalls of at least one of the blades, thereby to form a projection extending from the corresponding surfaces of the recess wing.

8. The tool as defined in claim 6 further comrpising:
   said groove being of decreasing depth in a direction extending toward said end of said tool.

9. The tool as defined in claim 6 further comprising:
   said groove being formed at an intermediate portion of said central core and between said blades.

10. An impact tool for forming driver-engageable surfaces at the end of a rotatable fastener comprising:
    a body portion having an axis and having a nib extending from an end of the body portion, the nib lying along said axis;
    said nib including a central core and a plurality of blades radiating generally outwardly from said core, each of said blades having opposite sidewalls and an end wall;
    means forming at least one elongate groove along one of said sidewalls of at least one of said blades, said groove extending from the juncture of said end wall and one of said sidewalls and along one of said sidewalls.

* * * * *